B. MARLEY, W. P. THACKER & R. P. BARNARD.
RESILIENT WHEEL.
APPLICATION FILED DEC. 18, 1912.

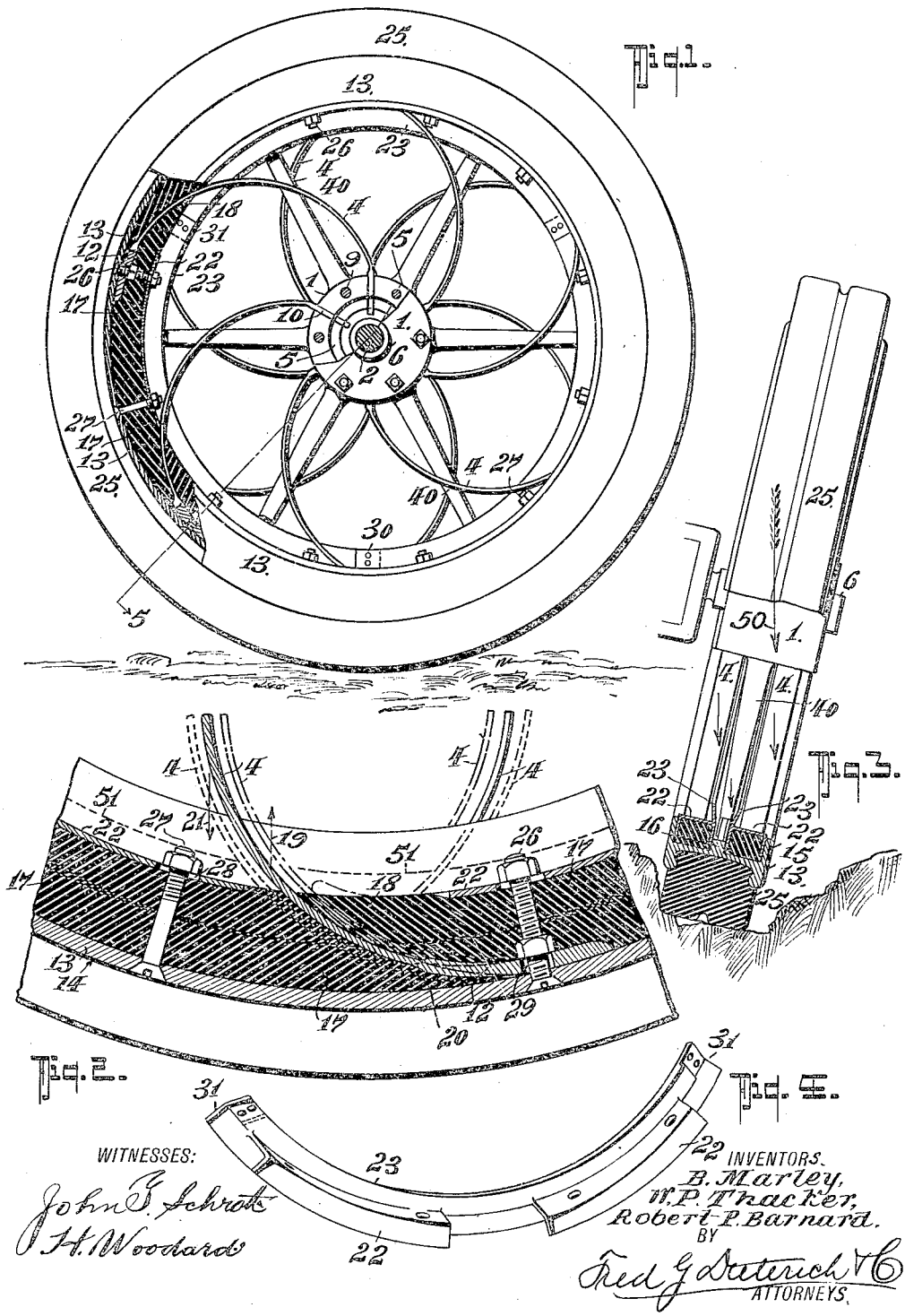

1,137,509.

Patented Apr. 27, 1915.
2 SHEETS—SHEET 2.

UNITED STATES PATENT OFFICE.

BERNARD MARLEY, WARREN PRESTON THACKER, AND ROBERT PARKER BARNARD, OF NOKOMIS, ILLINOIS.

RESILIENT WHEEL.

1,137,509.

Specification of Letters Patent.

Patented Apr. 27, 1915.

Application filed December 18, 1912. Serial No. 737,456.

*To all whom it may concern:*

Be it known that we, BERNARD MARLEY, WARREN PRESTON THACKER, and ROBERT PARKER BARNARD, all of Nokomis, in the county of Montgomery and State of Illinois, have invented a new and Improved Resilient Wheel, of which the following is a specification.

This invention relates to that type of resilient wheel more especially designed for auto vehicle uses and it has for its object to provide a wheel of the general type stated of a simple and economical construction, in which the several parts are so arranged and coöperatively combined, whereby to substantially provide the elastic effect obtained by pneumatic tires and the like, and for providing a durable wheel, the use of which avoids the inconvenience and expense caused by punctured tires.

In its more specific nature, our invention embodies certain improvements on the construction of a resilient wheel disclosed in our Patent #1,050,481, dated January 14, 1913.

One of the serious objections in the use of resilient wheels, of that type in which the spokes are in the nature of flat curved springs that join with the hub and the rim, is the tendency of the hub and the spokes to sag laterally under bumping actions of the wheel in traveling over rough roads, which tends to weaken the connections of the said spokes at their opposite ends.

One of the essential features of our present invention is to provide a wheel of the general type noted, in which is included means for overcoming the tendency of lateral buckling of the wheel body in going over rough places, as well as retarding undue strains on the resilient springs as the wheel passes over very deep ruts and the like.

With other objects in view, that will hereinafter appear, our invention consists of a resilient wheel that embodies the peculiar construction and novel arrangement of the parts hereinafter fully explained, specifically pointed out in the appended claims and illustrated in the accompanying drawings, in which:

Figure 1 is a side view of our improved resilient wheel being broken away and in section. Fig. 2 is a longitudinal section of a portion of the wheel taken on the line 2—2 on Fig. 5 with the cushion tire omitted. Fig. 3 is an edge view of the wheel, the lower part being shown in cross section, the same diagrammatically illustrating the relation of the reinforcing means, the cushion block, and the spring spokes when the wheel strikes a rut, the direction of the weight strain on the wheel being indicated by the arrows. Fig. 4 is a perspective view of one of the keepers or cover sections hereinafter specifically described. Fig. 5 is a cross section of the wheel, on a slightly enlarged scale, taken on the line 5—5 on Fig. 1. Fig. 6 is a detail perspective view that shows the hub and the spring spokes connecting therewith. Fig. 7 is a detail view of one of the spring spokes. Fig. 8 is a detail perspective view of one of the spokes of the supplemental or inner wheel and its attached rim portions. Figs. 9 and 10 are detail views of parts hereinafter mentioned. Fig. 11 is a detail view of a slightly modified arrangement of our invention.

In the drawings, we have shown our improved wheel as especially designed for automobiles and other heavy vehicles, it including two sets of spring spokes, a hub and a rim especially designed for coöperating with the two sets of spokes, this being a preferred construction.

Hub 1 is mounted on the shaft 2 and has radial grooves 3, two sets of grooves being shown, one groove being provided for the hub end of each of the spring spokes 4, the said hub also having an annular groove 5 in each side that bisects the several grooves 3, (see Figs. 5 and 6). At each end the hub has a lateral extension 6 to receive the apertured clamping disks 7 that have annular flanges 8 for seating in the grooves 5 in the hub faces, the reason for which will presently appear. The said disks 7 are held in place by the bolts 9. In the forms shown the wheel rim and the hub are of the required width to provide for the use of two sets of spokes and a separate set of cushioning connections or bearings for the outer ends of each set of spokes. The spokes 4 are curved plate springs (see Fig. 7) and the spokes of one set are curved and positioned oppositely to the spokes of the other set, the two sets of spokes being so mounted that they cross each other; such arrangement being provided to add stability and equalize the elasticity and strain of the spokes, laterally with respect to the rim and the hub. The spokes, in practice, are of stout strap steel and may be of any desired cross sectional shape to insure the desired strength and resiliency and may be curved in various shapes, preferably, however, in the arc of a circle, and to add strength, their outer ends are thickened.

The hub end 10 of each spoke has a notch 11 in one edge which, when the end 10 is inserted in the radial hub groove registers with the annular hub groove and the flanges 8 on the disks 7.

When two sets of spokes are used in a complete wheel, one edge only of each hub end of the spokes is notched, but when our type of wheel includes but one set of spokes, as shown in Fig. 11, the said spoke end 10 has a notch in each edge, as shown. The outer or tire engaging ends 12 of the spokes ride upon the inner face of the wheel rim 13, and the latter, in the preferred form, is of metal, its outer face 14 being suitably shaped to receive a cushion or outer tire 25. The rim 13 is formed with two outer annular flanges 15, and a central flange 16, and the said flanges extend inwardly in the manner best shown in Fig. 5.

To provide against breaking the outer ends of the spokes when going over rough road surfaces, or when the wheel is subjected to an excessive jolt or jar, we employ auxiliary elastic bearing connections between the spoke ends and the rim, the construction of which forms an essential feature of our invention. This connection, best shown in Fig. 2, comprises a series of elastic cushion blocks 17, one of which is interposed between the adjacent rim ends of each pair of spokes and the said blocks are so shaped and mounted relatively to the wheel rim, and to the spokes, that one end 18 forms a cushion bearing that tends to take up the inwardly bending strain of the spoke end when the upper end is pulling away from the hub, (see dotted arrows 19, on Fig. 2) while the other end 20 acts as a yielding bearing to take up the strain of the spoke end, as it presses downwardly (see full line arrow 21) while passing over a rough road surface.

Each elastic block 17 is held in place by a keeper or cover 22 formed of sheet metal and U-shaped in cross section, and each set of keepers 22 fits and rides between the internal flanges of the wheel rim. The keepers 22 in our present construction include an inwardly projected flange 23 that inclines outwardly so that when the parts are assembled the flanges 23 of the opposing keepers 22 form a cone shaped annular guide that merges with the annular socket 24 between the adjacent inner walls of the keepers 22 and into which the central flange of the rim projects as is clearly shown in Fig. 5. The keepers 22 are held in proper position on the blocks 17 by the bolts 26—27, one of which 27, passes through the rim, the elastic block and through an elongated aperture 28 in the keeper 22, while the other bolt 26 passes through the rim, an elongated aperture 29 in the spoke end, the elastic block 17 and through the aperture 30 in the adjacent spoke end, as shown. In the present construction the keepers 22 are each formed with apertured end extensions 31 so that the several sections can be readily joined to form, as it were, a continuous annular keeper.

For imparting great rigidity to the wheel and particularly for supporting the spring spoke arrangement against undue strains, laterally, and against excessive compression when the wheel is subjected to hard jolts, our present type of wheel includes, what we term, an inner wheel, which consists of a series of spokes, preferably of light material, either wood or metal. Each spoke 40 has an apertured tenon 41 for fitting the hub sockets and receiving the cross bolts that hold the clamp plates tightly against the ends of the hub. The outer end of each spoke 40 is circumferentially slotted and transversely apertured to receive the rim or felly sections 42 and to provide for a continuous rim, the sections 42 have their ends offset and apertured, the offsets lapping each other and held together by rivets or bolts and to deaden the said parts against noise, a leather or other facing 43 is secured in any suitable manner over the wide surfaces of the sections 42.

It will be noticed by referring to Fig. 5, when the parts are in the normal position, the rim of the inner wheel rides freely within the annular guideway formed by the opposing flanges of the keepers 22, the spokes of the inner wheel being of such shape, relatively to the spring spokes, that there will be no scraping or contacting of the two sets of spokes.

To prevent rattling, deadener members 44 of leather, or other suitable material, shaped like that shown in Fig. 9, are held on the short tenons of the spokes 40 (see Fig. 5), similar members 45 being provided for the inner wheel, spoke and rim connection.

By reason of the construction as described and shown, any one of the spring spokes, in case of breakage, may readily be removed and replaced by a new spoke. Each spring spoke 4 acts as an individual spring member and since the rim end thereof rests for a distance between the elastic blocks 17, the latter present an abrupt bending or breaking of the spokes at such ends.

The inner wheel being a solid body and rigidly connected to the hub of the spring or main wheel, the said wheel, when the main wheel strikes a rut or bad road place, (see for example, Fig. 3) the weight or strain on the wheel is in the direction of the arrow 50 and being in the position shown, it follows that a large per cent. of the strain is transmitted through the spokes of the inner wheel against the main wheel rim, by reason of the rim of the inner wheel engaging the inner side faces of the keepers 22 that are incased by the side flanges of the main wheel rim and also by reason of the rim of the inner wheel solidly engaging the central flange of the main rim.

In case the wheel gets a sudden excessive jolt while traveling on a level road the inner wheel rim will be forced down to take the position indicated by the broken line 51 on Fig. 2, and since it then rests on the central flange of the outer rim it follows that the inner wheel when at that position relieves the spring spokes of further strain.

By reason of the peculiar form and mounting of the inner or rigid inner wheel within the spring spoke wheel, the rocking or buckling motions, incident in the use of spring spoke wheels, is practically overcome and a complete wheel structure provided that has the necessary side strength when the weight of the vehicle is thrown against the wheel when passing rapidly around corners, when skidding, or when the wheel engages a depression.

In our present type of wheel when any great strain is brought against our spring spoke wheel that tends to buckle it laterally, the rim of the inner wheel being depressed, is brought against the central flange, as well as against the elastic blocks and the side flanges, of the main rim.

What we claim is:

1. In a resilient wheel, a hub, an outer rim including a pair of internal annular grooves and a separating internal annular web having a tread face, spring spokes having one end connected with said hub and the other end lying in said internal grooves of said rim, clamping members in said grooves for retaining said spokes in place, said clamping members including opposing annular ring portions to form an internal channel way in connection with said separating web, and an internal rim member lying normally in said channel way out of contact with the walls thereof and rigidly connected with said hub, substantially as shown and described.

2. In a resilient wheel, a hub, an outer rim including a pair of internal annular grooves and a separating internal annular web having a tread face, spring spokes having one end connected with said hub and the other end lying in said internal grooves of said rim, clamping members in said grooves for retaining said spokes in place, said clamping members including opposing annular ring portions to form an internal channel way in connection with said separating web, and an internal rim member lying normally in said channel way out of contact with the walls thereof and rigidly connected with said hub, said channel way including a flared mouth in which said internal rim is normally located, said channel way also including a restricted portion of a width substantially equal to that of said internal rim, whereby when said internal rim rides on the tread face of said separating web when said spring supports are excessively compressed the sides of said internal rim will lie in close proximity to the side walls of said channel way, substantially as shown and described.

3. In a wheel of the character described; the combination of a rim having an internal annular groove and an annular flange centrally of the groove, a pair of sets of curved resilient spokes, one set being at each side of the central flange on the rim, said spokes each having one end connected to the wheel hub, and the other end slidably engaging the annular groove in the rim, elastic blocks that coöperate with the rim ends of the spokes, and a shaped keeper that covers the said blocks, said keeper including an internally extended flange, the adjacent flanged faces of the keeper forming a central guideway; of a series of rigid spokes projected from the wheel hub, between the two sets of resilient springs, and a rim mounted on the ends of the spokes, said rim being movable within the aforesaid central guideway and adapted for engaging the said guideway under lateral strain on the resilient spokes.

BERNARD MARLEY.
WARREN PRESTON THACKER.
ROBERT PARKER BARNARD.

Witnesses:
WILLIAM A. YOUNG,
CHAS. E. ROWE.

Copies of this patent may be obtained for five cents each, by addressing the "Commissioner of Patents, Washington, D. C."